US010460302B2

(12) United States Patent
Green et al.

(10) Patent No.: US 10,460,302 B2
(45) Date of Patent: Oct. 29, 2019

(54) SYSTEMS AND METHODS FOR TRANSACTIONAL DOCUMENT PROCESSING

(71) Applicant: First Data Corporation, Greenwood Village, CO (US)

(72) Inventors: Brian Green, Mississauga (CA); Charles R. Williams, Greenwood Village, CO (US)

(73) Assignee: First Data Corporation, Greenwood Village, CO (US)

( * ) Notice: Subject to any disclaimer, the term of this patent is extended or adjusted under 35 U.S.C. 154(b) by 369 days.

(21) Appl. No.: 15/291,569

(22) Filed: Oct. 12, 2016

(65) Prior Publication Data

US 2017/0103375 A1    Apr. 13, 2017

Related U.S. Application Data

(60) Provisional application No. 62/240,211, filed on Oct. 12, 2015.

(51) Int. Cl.
*G06Q 20/20* (2012.01)
*G06Q 10/10* (2012.01)
(Continued)

(52) U.S. Cl.
CPC .......... *G06Q 20/204* (2013.01); *G06Q 10/10* (2013.01); *G06Q 20/042* (2013.01); *G06Q 20/3223* (2013.01)

(58) Field of Classification Search
CPC ...... G06Q 20/40; G06Q 20/32; G06Q 20/042; G06K 5/00; G06K 7/10
(Continued)

(56) References Cited

U.S. PATENT DOCUMENTS 9,269,010 B2 * 2/2016 Abulafia .............. G06K 9/2054
2006/0129485 A1   6/2006 Hamzy et al.
(Continued)

OTHER PUBLICATIONS

International Search Report and Written Opinion for PCT/US2016/056590, dated Jan. 24, 2017.

*Primary Examiner* — Olusegun Goyea
(74) *Attorney, Agent, or Firm* — Eversheds Sutherland (US) LLP

(57) ABSTRACT

Embodiments of the disclosure can include systems, methods, computer-readable media, techniques and methodologies for transactional document processing. Users can utilize documents to complete transactions. A user device, such as a point of sale (POS) device may be used to enter user information as well as capture an image of a check. A financial service server, in communication with the POS device, may forward the request to a document analysis server. The document analysis server may use the information received from the POS device to determine whether the document is approved to be used in a transaction. The document analysis server may obtain financial information from an image of the check. The document analysis server may use the user information and financial information to obtain additional information (e.g., credit history, transaction history, etc.). The document analysis server may also determine whether to generate a recommendation with an approval or rejection of the use of the document for the transaction.

20 Claims, 4 Drawing Sheets

(51) Int. Cl.
*G06Q 20/04* (2012.01)
*G06Q 20/32* (2012.01)

(58) Field of Classification Search
USPC .............................. 705/30, 35, 44; 235/380
See application file for complete search history.

(56) References Cited

U.S. PATENT DOCUMENTS

| | | | |
|---|---|---|---|
| 2009/0173784 A1* | 7/2009 | Yang | G06Q 20/042 |
| | | | 235/380 |
| 2010/0128131 A1* | 5/2010 | Tenchio | G06K 9/2054 |
| | | | 348/207.1 |
| 2012/0024946 A1 | 2/2012 | Tullis et al. | |
| 2012/0143760 A1* | 6/2012 | Abulafia | G06K 9/2054 |
| | | | 705/44 |

* cited by examiner

SYSTEMS AND METHODS FOR TRANSACTIONAL DOCUMENT PROCESSING

RELATED APPLICATION

This application claims priority to U.S. Ser. No. 62/240,211, titled "Systems and Methods for Transactional Document Processing," filed Oct. 12, 2015, the contents of which are incorporated by reference.

BACKGROUND

The improvements in technology and computing allow users to generate, transmit, and process documents without the delay that is generally associated with the transmission and receipt of physical documents. Users are able to scan, copy, fax, or otherwise take a physical document and generate an electronic document, which may be more easily and quickly distributed or processed.

BRIEF DESCRIPTION OF THE DISCLOSURE

According to example embodiments of the disclosure, there may be a system. The system may comprise: a first server and a second server, wherein; the first server may identify a transactions analysis request associated with a document for a transaction, wherein the transaction analysis request may comprise data received from a graphical user interface displayed on a user device and an image of the document; the first server may transmit the received transactions analysis request to the second server; the second server may identify information from the image of the document; the second server may determine that the document should be used in the transaction based at least in part on the information obtained from the image of the document and the data received from the user device; the second server may generate a response to the transaction analysis request, wherein the response comprises a recommendation to use the document for the transaction; and the second server may transmit the response to the transaction analysis request to the user device.

Implementation may include one or more of the following features. The recommendation may comprise instructions to fund the payment instrument. The second server may transmit a message to the first server to complete the transaction based at least in part on the information obtained from the image of the document and the data received from the user device. The transactions analysis request may further comprise information received by the user device from a first device in communication with the user device. The image may comprise an image of a payment instrument. The data received from the user device may comprise one or more of a driver's license identifier and a username. The information from the image of the document may comprise one or more of a type of transaction, an amount of transaction, and a date of transaction. The second server may identify information from the image of the document using optical character recognition (OCR). The second server may determine that the document should be used in the transaction further comprises the second server identifying a transaction history associated with the user. The transaction history associated with the user may further comprise at least one of a negative transaction between the user and a merchant and information indicative of user standing with the merchant.

According to example embodiments of the disclosure, there may be a non-transitory computer-readable medium. The non-transitory computer-readable medium may store computer-executable instructions which, when executed by a processor, may cause the processor to perform operations comprising: a first server; and a second server; wherein: the first server identifies a transactions analysis request associated with a document for a transaction, wherein the transaction analysis request comprises data received from a graphical user interface displayed on a user device and an image of the document; the first server transmits the received transactions analysis request to the second server; the second server identifies information from the image of the document; the second server determines that the document should be used in the transaction based at least in part on the information obtained from the image of the document and the data received from the user device; the second server generates a response to the transaction analysis request, wherein the response comprises a recommendation to use the document for the transaction; and the second server transmits the response to the transaction analysis request to the user device.

Implementation may include one or more of the following features. The recommendation may comprise instructions to fund the payment instrument. The second server may transmit a message to the first server to complete the transaction based at least in part on the information obtained from the image of the document and the data received from the user device. The transactions analysis request may further comprise information received by the user device from a first device in communication with the user device. The image may comprise an image of a payment instrument. The data received from the user device may comprise one or more of a driver's license identifier and a username. The information from the image of the document may comprise one or more of a type of transaction, an amount of transaction, and a date of transaction. The second server may identify information from the image of the document using optical character recognition (OCR). The second server may determine that the document should be used in the transaction further comprises the second server identifying a transaction history associated with the user. The transaction history associated with the user may further comprise at least one of a negative transaction between the user and a merchant and information indicative of user standing with the merchant.

According to example embodiments of the disclosure, there may be a method. The method may comprise: a first server; and a second server; wherein: the first server identifies a transactions analysis request associated with a document for a transaction, wherein the transaction analysis request comprises data received from a graphical user interface displayed on a user device and an image of the document; the first server transmits the received transactions analysis request to the second server; the second server identifies information from the image of the document; the second server determines that the document should be used in the transaction based at least in part on the information obtained from the image of the document and the data received from the user device; the second server generates a response to the transaction analysis request, wherein the response comprises a recommendation to use the document for the transaction; and the second server transmits the response to the transaction analysis request to the user device.

Implementation may include one or more of the following features. The recommendation may comprise instructions to fund the payment instrument. The second server may transmit a message to the first server to complete the transaction based at least in part on the information obtained from the image of the document and the data received from the user device. The transactions analysis request may further comprise information received by the user device from a first device in communication with the user device. The image may comprise an image of a payment instrument. The data received from the user device may comprise one or more of a driver's license identifier and a username. The information from the image of the document may comprise one or more of a type of transaction, an amount of transaction, and a date of transaction. The second server may identify information from the image of the document using optical character recognition (OCR). The second server may determine that the document should be used in the transaction further comprises the second server identifying a transaction history associated with the user. The transaction history associated with the user may further comprise at least one of a negative transaction between the user and a merchant and information indicative of user standing with the merchant.

According to example embodiments of the disclosure, there may be an apparatus. The apparatus may further comprise means for: a first server; and a second server; wherein: the first server identifies a transactions analysis request associated with a document for a transaction, wherein the transaction analysis request comprises data received from a graphical user interface displayed on a user device and an image of the document; the first server transmits the received transactions analysis request to the second server; the second server identifies information from the image of the document; the second server determines that the document should be used in the transaction based at least in part on the information obtained from the image of the document and the data received from the user device; the second server generates a response to the transaction analysis request, wherein the response comprises a recommendation to use the document for the transaction; and the second server transmits the response to the transaction analysis request to the user device.

Implementation may include one or more of the following features. The recommendation may comprise instructions to fund the payment instrument. The second server may transmit a message to the first server to complete the transaction based at least in part on the information obtained from the image of the document and the data received from the user device. The transactions analysis request may further comprise information received by the user device from a first device in communication with the user device. The image may comprise an image of a payment instrument. The data received from the user device may comprise one or more of a driver's license identifier and a username. The information from the image of the document may comprise one or more of a type of transaction, an amount of transaction, and a date of transaction. The second server may identify information from the image of the document using optical character recognition (OCR). The second server may determine that the document should be used in the transaction further comprises the second server identifying a transaction history associated with the user. The transaction history associated with the user may further comprise at least one of a negative transaction between the user and a merchant and information indicative of user standing with the merchant.

According to example embodiments of the disclosure, there may be a device. The device may have at least one memory that stores computer-executable instructions. One processor of the one or more processors may be configured to access the at least one memory, wherein the at least one processor of the one or more processors may be configured to execute the computer-executable instructions to: identify, by the processor, a received transactions analysis request associated with a document for a transaction, wherein the transaction analysis request comprises data received from a graphical user interface displayed on a user device and an image of the document captured using a camera on the user device; identify, by the processor, information from the image of the document; determine, by the processor, that the document should be used in the transaction based at least in part on the information obtained from the image of the document and the data received from the user device; generate, by the processor, a response to the transaction analysis request, wherein the response comprises a recommendation to use the document for the transaction; and cause to send, by the processor, the response to the transaction analysis request to the user device.

Implementation may include one or more of the following features. The transactions analysis request may further comprise information received by the user device from a first device in communication with the user device. The instructions to determine may further comprise instructions to cause to send the transaction analysis request to a first server for processing. The image may comprise an image of a payment instrument. The recommendation comprises instructions to fund the payment instrument. The data received from the user device may comprise one or more of a driver's license identifier and a username. The information from the image of the document may comprise one or more of a type of transaction, an amount of transaction, and a date of transaction.

According to example embodiments of the disclosure, there may be a non-transitory computer-readable medium. The non-transitory computer-readable medium may store computer-executable instructions which, when executed by a processor, may cause the processor to perform operations comprising: identifying, by the processor, a received transactions analysis request associated with a document for a transaction, wherein the transaction analysis request comprises data received from a graphical user interface displayed on a user device and an image of the document captured using a camera on the user device; identifying, by the processor, information from the image of the document; determining, by the processor, that the document should be used in the transaction based at least in part on the information obtained from the image of the document and the data received from the user device; generating, by the processor, a response to the transaction analysis request, wherein the response comprises a recommendation to use the document for the transaction; and causing to send, by the processor, the response to the transaction analysis request to the user device.

Implementation may include one or more of the following features. The transactions analysis request may further comprise information received by the user device from a first device in communication with the user device. The instructions to determine further comprise instructions to cause to send the transaction analysis request to a first server for processing. The image comprises an image of a payment instrument. The data received from the user device may comprise one or more of a driver's license identifier and a username. The information from the image of the document may comprise one or more of a type of transaction, an amount of transaction, and a date of transaction. The identifying information from the image of the document further comprises identifying information from the image of the document using optical character recognition (OCR). The determining may further comprise identifying a transaction history associated with the user. The transaction history associated with the user may further comprise at least one of a negative transaction between the user and a merchant and information indicative of user standing with the merchant.

According to example embodiments of the disclosure, there may be a method. The method may comprise: identifying, by the processor, a received transactions analysis request associated with a document for a transaction, wherein the transaction analysis request comprises data received from a graphical user interface displayed on a user device and an image of the document captured using a camera on the user device; identifying, by the processor, information from the image of the document; determining, by the processor, that the document should be used in the transaction based at least in part on the information obtained from the image of the document and the data received from the user device; generating, by the processor, a response to the transaction analysis request, wherein the response comprises a recommendation to use the document for the transaction; and causing to send, by the processor, the response to the transaction analysis request to the user device.

Implementation may include one or more of the following features. The transactions analysis request may further comprise information received by the user device from a first device in communication with the user device. The instructions to determine further comprise instructions to cause to send the transaction analysis request to a first server for processing. The image comprises an image of a payment instrument. The data received from the user device may comprise one or more of a driver's license identifier and a username. The information from the image of the document may comprise one or more of a type of transaction, an amount of transaction, and a date of transaction. The identifying information from the image of the document further comprises identifying information from the image of the document using optical character recognition (OCR). The determining may further comprise identifying a transaction history associated with the user. The transaction history associated with the user may further comprise at least one of a negative transaction between the user and a merchant and information indicative of user standing with the merchant.

According to example embodiments of the disclosure, there may be an apparatus. The apparatus may further comprise means for: identifying, by the processor, a received transactions analysis request associated with a document for a transaction, wherein the transaction analysis request comprises data received from a graphical user interface displayed on a user device and an image of the document captured using a camera on the user device; identifying, by the processor, information from the image of the document; determining, by the processor, that the document should be used in the transaction based at least in part on the information obtained from the image of the document and the data received from the user device; generating, by the processor, a response to the transaction analysis request, wherein the response comprises a recommendation to use the document for the transaction; and causing to send, by the processor, the response to the transaction analysis request to the user device.

Implementation may include one or more of the following features. The transactions analysis request may further comprise information received by the user device from a first device in communication with the user device. The instructions to determine further comprise instructions to cause to send the transaction analysis request to a first server for processing. The image comprises an image of a payment instrument. The data received from the user device may comprise one or more of a driver's license identifier and a username. The information from the image of the document may comprise one or more of a type of transaction, an amount of transaction, and a date of transaction. The identifying information from the image of the document further comprises identifying information from the image of the document using optical character recognition (OCR). The determining may further comprise identifying a transaction history associated with the user. The transaction history associated with the user may further comprise at least one of a negative transaction between the user and a merchant and information indicative of user standing with the merchant.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

This disclosure relates to, among other things, systems, methods, computer-readable media, techniques and methodologies for transactional document processing. In some embodiments, users may wish to utilize documents to complete transactions. For example, for a purchase transaction, a user may desire to utilize a check to pay for a product or service. In some embodiments, a user device, such as a point of sale (POS) device may be used to enter user information as well as capture an image of a check. A request associated with the purchase transaction can be initiated by the POS device. A financial service server, in communication with the POS device, may forward the request to a document analysis server. The document analysis server may use the information received from the POS device to determine whether the document is approved to be used in a transaction. The document analysis server may obtain financial information (e.g., routing and account information) from an image of the check by using optical character recognition (OCR). The document analysis server may use the user information and financial information to obtain additional information (e.g., credit history, transaction history, spending history from bank of the checking or savings account associated with the check, etc.). The document analysis server may also determine whether to generate a recommendation with an approval or rejection of the use of the document (e.g., check) for the transaction. The document analysis server may also receive an indication of approval or rejection, from a user device, of the use of the document for the transaction, and corresponding instructions to facilitate use of the document for the transaction can be transmitted to a suitable entity, device, or server.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Cases and System Architecture

Figure 1:
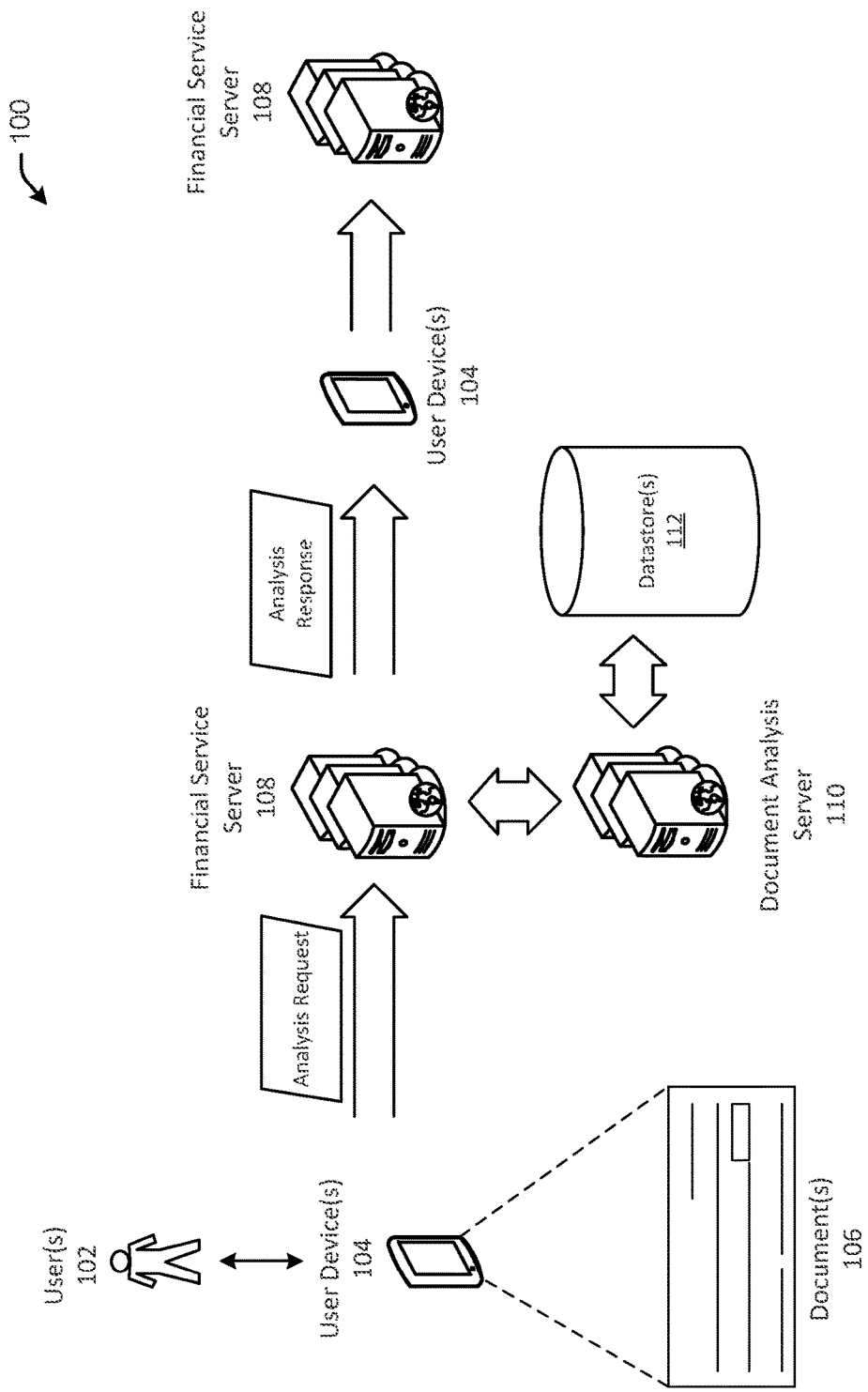
FIG. 1 depicts an illustrative data flow between various components of an illustrative system architecture for document processing for financial transactions in accordance with one or more embodiments of the disclosure.

FIG. 1 depicts an illustrative data flow between various components of an illustrative system architecture 100 for document processing for financial transactions in accordance with one or more embodiments of the disclosure.

One or more illustrative user devices 104 operable by one or more users 102 are illustratively depicted in FIG. 1. The user device(s) 104 may include any suitable device capable of facilitating transactions, communicating with other devices over a network, and obtaining information (e.g., graphical user interface and/or sensors associated with the user device 104). The user device(s) 104 may include any suitable processor-driven computing device including, but not limited to, a smartphone or other cellular device, a tablet device, an electronic reader device, a laptop computing device, a gaming console, a multimedia content streaming device, a set-top box, wearable computing devices, and so forth. For ease of explanation, the user device(s) 104 and the user(s) 102 may be described herein in the singular; however, it should be appreciated that multiple user devices 104 operable by multiple users 102 may be provided.

In various example embodiments, a user 102 may interact with a user device 104 to provide user information via a graphical user interface. For example, in conjunction with a purchase transaction initiated on the user device 104, a user may provide their name, address, phone number, email address, and the like using a touch display or other input/output mechanism, such as a keyboard and mouse. The user device 104 may obtain an image of a document 106 using one or more sensor devices, such as a camera. An example document may be a payment instrument, such as a check. The user device 104 may generate and transmit to a financial service server 108 a request for document analysis that includes transactional information (e.g., total amount owed by the user 102 for the purchase transaction, document image, and user information).

In some embodiments, the financial service server 108 may receive the request for document analysis. The financial service server 108 may use the information in the request to generate a recommendation as to whether the document 106 is approved or rejected for a pre-determined purpose. For example, a check may be presented to fund payment of a purchase transaction. In some embodiments, the financial service server 108 may facilitate obtaining financial information from the image of the document 106 using optical character recognition. The information may include, in the case the document 106 is a check, routing and account information for a savings or checking account associated with the document 106. The financial service server 108 may transmit the user information, financial information, and transaction information to the document analysis server 110. The document analysis server 110 may use the user information, financial information, and transaction information to determine whether to reject or approve the document 106. The document analysis server 110 may determine to reject or approve the document 106 and may transmit the determination to the financial service server 108. If the document is approved, an action may be taken. For example, if the document 106 is approved, a settlement of the transaction may be initiated and a message may be generated and transmitted to the user device 104 indicating that the document 106 was approved. If the document is not approved, a message may be transmitted to the user device 104 indicating a recommendation that the document 106 not be approved for the transaction. In some embodiments, the message may include a request for an alternative document or payment instrument. In some embodiments, the user 102 may indicate to ignore the recommendation and may indicate to complete the transaction using the previously submitted document 106.

Figure 2:
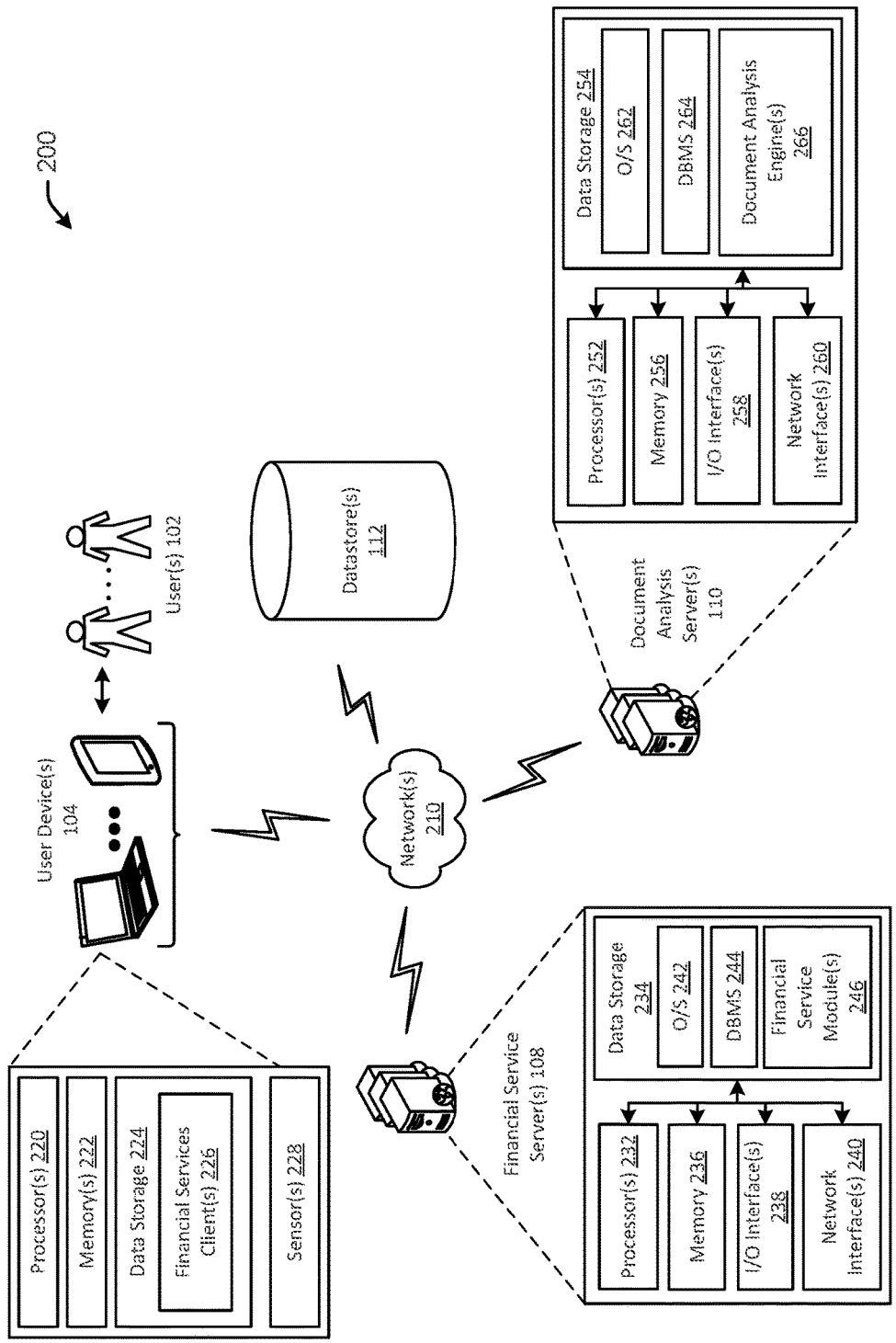
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture depicted in FIG. 1 in accordance with one or more embodiments of the disclosure. The illustrative architecture 200 may include one or more user devices 104 operable by one or more users 102, one or more financial service server(s) 108, one or more document analysis server(s) 110, and/or one or more datastore(s) 112. The user device(s) 104 may include any of the types of devices described through reference to FIG. 1.

Any of the user device(s) 104, one or more financial service server(s) 108, one or more document analysis server(s) 110, and/or one or more datastore(s) 112 may be configured to communicate with each other and any other component of the architecture 200 via one or more network(s) 210. The network(s) 210 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 210 may have any suitable communication range associated therewith and may include, for example, global networks (e.g., the Internet), metropolitan area networks (MANs), wide area networks (WANs), local area networks (LANs), or personal area networks (PANs). In addition, the network(s) 210 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

The user devices 104 may include one or more processor(s) 220 that may include any suitable processing unit capable of accepting digital data as input, processing the input data based on stored computer-executable instructions, and generating output data. The computer-executable instructions may be stored, for example, in the data storage 224 and may include, among other things, operating system software and application software. The computer-executable instructions may be retrieved from the data storage 224 and loaded into the memory 222 as needed for execution. The processor(s) 220 may be configured to execute the computer-executable instructions to cause various operations to be performed. The processor(s) 220 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 224 may store program instructions that are loadable and executable by the processor(s) 220, as well as data manipulated and generated by the processor(s) 220 during execution of the program instructions. The program instructions may be loaded into the memory 222 as needed for execution. Depending on the configuration and implementation of the user device(s) 104, the memory 222 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 222 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

Various program modules, applications, or the like may be stored in data storage 224 that may comprise computer-executable instructions that when executed by the processor(s) 220 cause various operations to be performed. The memory 222 may have loaded from the data storage 224 one or more operating systems (O/S) that may provide an interface between other application software (e.g., dedicated applications, a browser application, a web-based application, a distributed client-server application, etc.) executing on the developer workstations 106 and the hardware resources of the user device(s) 104. More specifically, the O/S may include a set of computer-executable instructions for managing the hardware resources of the user device(s) 104 and for providing common services to other application programs (e.g., managing memory allocation among various application programs). The O/S may include any operating system now known or which may be developed in the future including, but not limited to, any mobile operating system, desktop or laptop operating system, mainframe operating system, or any other proprietary or open-source operating system.

The data storage 224 may additionally include various other program modules that may include computer-executable instructions for supporting a variety of associated functionality. For example, the data storage 224 may include one or more financial service client(s) 226 or modules. The financial service client(s) 226 or modules may include computer-executable instructions that in response to execution by the processor(s) 220 cause operations to be performed including receiving data from a user 102 via a graphical user interface, facilitating capturing an image of a document 106 utilizing one or more sensor device(s) 228, generating and transmitting messages to transmit to a financial service server 108, receiving messages from the financial service server 108, and displaying the message to the user 102.

The user device(s) 104 may include one or more sensor device(s) 228, such as image sensors and/or collection devices (e.g., a microphone, cameras, video cameras, near field communication (NFC) scanners, RF scanners, infrared scanners, quick response (QR) code scanners, etc.) to capture one or more universal resource identifier(s) (URIs).

The financial service server(s) 108 may include one or more processors 232 and one or more memories 236 (referred to herein generically as memory 236). The processor(s) 232 may include any suitable processing unit capable of accepting digital data as input, processing the input data based on stored computer-executable instructions, and generating output data. The computer-executable instructions may be stored, for example, in the data storage 234 and may include, among other things, operating system software and application software. The computer-executable instructions may be retrieved from the data storage 234 and loaded into the memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the processor(s) 232, as well as data manipulated and generated by the processor(s) 232 during execution of the program instructions. The program instructions may be loaded into the memory 236 as needed for execution. Depending on the configuration and implementation of the financial service server(s) 108, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The financial service server(s) 108 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The financial service server(s) 108 may further include network interface(s) 240 that facilitate communication between the financial service server(s) 108 and other devices of the illustrative system architecture 200 (e.g., user device(s) 104, document analysis server(s) 110, etc.) or application software via the network(s) 210. The financial service server(s) 108 may additionally include one or more input/output (I/O) interfaces 238 (and optionally associated software components such as device drivers) that may support interaction between a user and a variety of I/O devices, such as a keyboard, a mouse, a pen, a pointing device, a voice input device, a gesture detection and/or capture device, a touch input device, a display, speakers, a camera, a microphone, a printer, and so forth.

Referring again to the data storage 234, various program modules, applications, or the like may be stored therein that may comprise computer-executable instructions that when executed by the processor(s) 232 cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the financial service server(s) 108 and the hardware resources of the financial service server(s) 108. More specifically, the O/S 242 may include a set of computer-executable instructions for managing the hardware resources of the financial service server(s) 108 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores. The DBMS 244 may use any of a variety of database models (e.g., relational model, object model, etc.) and may support any of a variety of query languages.

The data storage 234 may additionally include various other program modules that may include computer-executable instructions for supporting a variety of associated functionality. For example, the data storage 234 may include one or more financial service module(s) 246. The financial service module(s) 246 may include computer-executable instructions that in response to execution by the processor(s) 232 cause operations to be performed including receiving data from and transmitting message to user device(s) 104 and/or document analysis server(s) 110, initiating transactions based on information received from the user device(s) 104 and/or document analysis server(s) 110, and the like.

Within the data storage 234, one or more modules may be stored. As used herein, the term module may refer to a functional collection of instructions that may be executed by the one or more processor(s) 232. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The document analysis server(s) 110 may include one or more processors 252 and one or more memories 256 (referred to herein generically as memory 256). The processor(s) 252 may include any suitable processing unit capable of accepting digital data as input, processing the input data based on stored computer-executable instructions, and generating output data. The computer-executable instructions may be stored, for example, in the data storage 254 and may include, among other things, operating system software and application software. The computer-executable instructions may be retrieved from the data storage 254 and loaded into the memory 256 as needed for execution. The processor(s) 252 may be configured to execute the computer-executable instructions to cause various operations to be performed. The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the processor(s) 252, as well as data manipulated and generated by the processor(s) 252 during execution of the program instructions. The program instructions may be loaded into the memory 256 as needed for execution. Depending on the configuration and implementation of the document analysis server(s) 110, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The document analysis server(s) 110 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The document analysis server(s) 110 may further include network interface(s) 260 that facilitate communication between the document analysis server(s) 110 and other devices of the illustrative system architecture 200 (e.g., user device(s) 104, financial service server(s) 108, etc.) or application software via the network(s) 210. The document analysis server(s) 110 may additionally include one or more input/output (I/O) interfaces 258 (and optionally associated software components such as device drivers) that may support interaction between a user and a variety of I/O devices, such as a keyboard, a mouse, a pen, a pointing device, a voice input device, a gesture detection and/or capture device, a touch input device, a display, speakers, a camera, a microphone, a printer, and so forth.

Referring again to the data storage 254, various program modules, applications, or the like may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the document analysis server(s) 110 and the hardware resources of the document analysis server(s) 110. More specifically, the O/S 262 may include a set of computer-executable instructions for managing the hardware resources of the document analysis server(s) 110 and for providing common services to other application programs (e.g., managing memory allocation among various application programs). The O/S 262 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores. The DBMS 264 may use any of a variety of database models (e.g., relational model, object model, etc.) and may support any of a variety of query languages.

The data storage 254 may additionally include various other program modules that may include computer-executable instructions for supporting a variety of associated functionality. For example, the data storage 254 may include one or more document analysis engine(s) 266.

The document analysis engine(s) 266 may include computer-executable instructions that in response to execution by the processor(s) 252 cause operations to be performed including obtaining additional information using user information and/or financial information using information obtained from the user 102, image of the document 106, or the like, where the additional information may include a credit history, transactional history from other merchants, transactional history from the bank of the savings or checking account of the user, or other types of information. Based on the additional information, the document analysis engine 266 may generate a recommendation to either approve or reject the use of the document 106 in a transaction.

Within the data storage 254, one or more modules may be stored. As used herein, the term module may refer to a functional collection of instructions that may be executed by the one or more processor(s) 252. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Those of ordinary skill in the art will appreciate that any of the components of the system architecture 200 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 200, and the associated functionality that such components support, are merely illustrative and that some components may not be present or additional components may be provided in various embodiments. While various program modules have been depicted and described with respect to various illustrative components of the system architecture 200, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative system architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 200, or additional functionality.

Illustrative Processes

Figure 3:
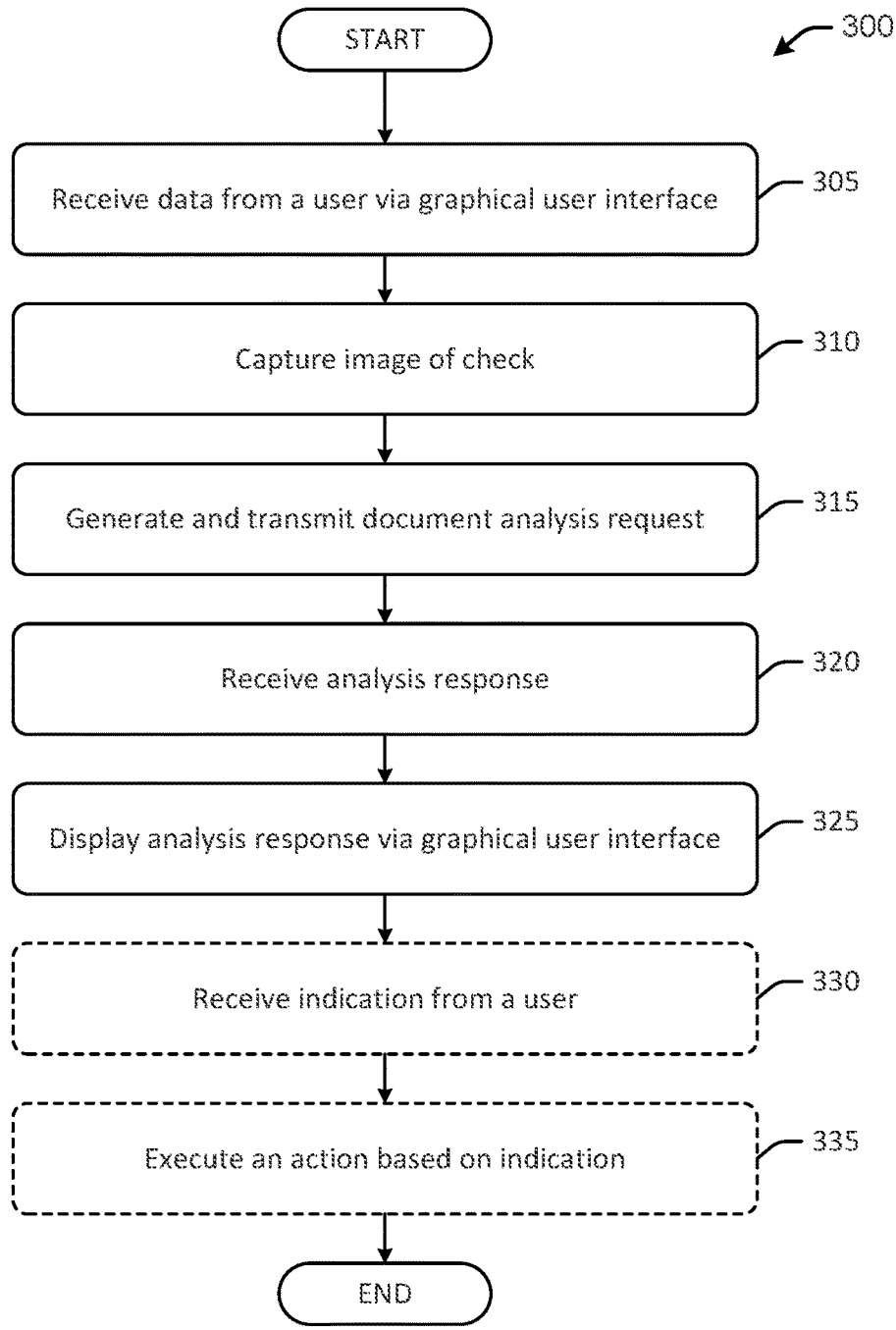
FIG. 3 is a process flow diagram of an illustrative method for requesting document processing for financial transactions in accordance with one or more embodiments of the disclosure.

FIG. 3 is a process flow diagram of an illustrative method 300 for requesting document processing for financial transactions in accordance with one or more embodiments of the disclosure. At block 305, the financial services client 226 of the user device 104 may receive data from a user 102 via a graphical user interface displayed on the user device 104. In some embodiments, the data may include, but is not limited to user information from a user (e.g., a driver's license identifier, a username, etc.), transaction information (e.g., type of transaction, amount of transaction, date of transaction), or other types of information. For example, if the transaction is a purchase transaction, the data may also include merchant information (e.g., merchant identifier, merchant type, merchant location, etc.).

At block 310, an image of a document 106 may be captured using one or more sensors 228 of the user device 104, such as a camera. An example of a document that may be scanned may include a check associated with a checking or savings account.

At block 315, the financial services client 226 of the user device 104 may generate a document analysis request including the user information, information associated with a transaction (e.g., sales transaction), and the image of the document 106. The document analysis request may be transmitted to the financial service server 108 for processing.

At block 320, the financial service client 226 of the user device 104 may receive a response from the financial service server 108. In some embodiments, the response may indicate a recommendation to take a specified action. For example, if the document is a payment instrument, such as a check, the recommendation may be to fund the check (e.g., bank to pay the merchant in the amount requested in the check). In some embodiments, the action may be to deny funding of the check. In some embodiments, the recommendation to deny funding the check may include initiating a request for an alternative document or payment instrument to complete the transaction.

At block 325, the financial service client 226 of the user device 104 may display the response from the server to the user 102. The response may be emailed to an email address specified by the user 102, texted to a number specified by the user 102, displayed on the user device 104, or the like. Furthering the above example, if the recommendation in the analysis response indicated that the document (e.g., check) was approved for funding, the financial service servicer 108 may initiate a transfer of the requested funds from the account associated with the check to a merchant account specified by the merchant. The transaction may thus be processed and concluded.

In some embodiments, if the recommendation in the analysis response indicated that the document (e.g., check) was not approved for funding, the financial service client 226 may display a message to the user 102 requesting an alternative document or payment instrument. In some embodiments, the message may also include a request to override the recommendation and to fund the request.

At optional block 330, the financial service client 226 of the user device 104 may receive an indication from a user 102. The indication may identify an action to take in response to the analysis response. For example, the action may be to process the transaction using the requested alternative document or payment instrument that has been provided by the user 102 or to proceed with the document as previously provided.

At optional block 335, financial service client 226 of the user device 104 may execute the identified action based on the indication. For example, the financial service client 226 may resume processing the transaction using an alternative document or payment instrument provided by the user 102. In some embodiments, the financial service client 226 may have received an indication to ignore the recommendation and may proceed to process the transaction using the document that was initially provided.

Figure 4:
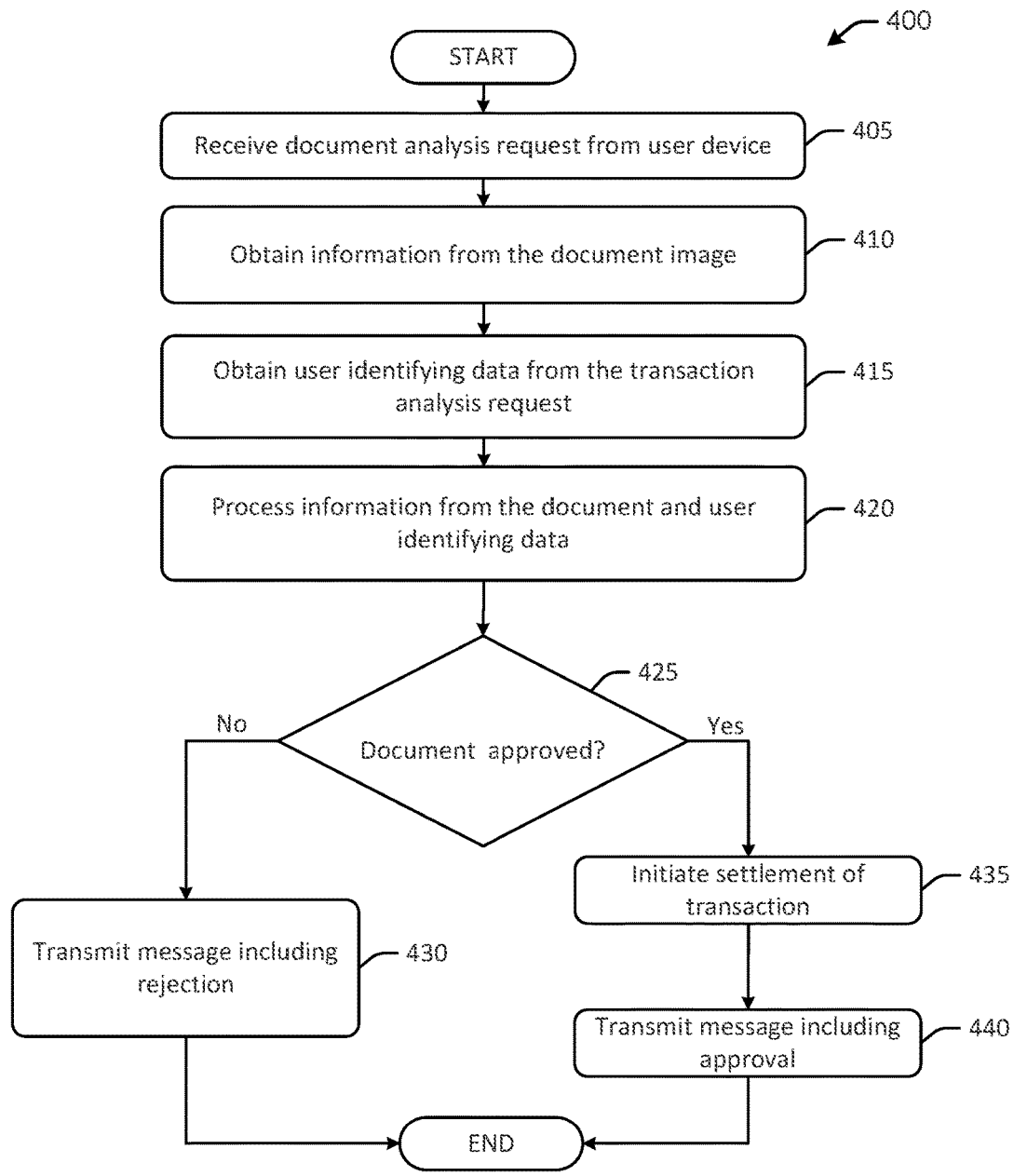
FIG. 4 is a process flow diagram of an illustrative method for processing a request for document processing for financial transactions in accordance with one or more embodiments of the disclosure.

FIG. 4 is a process flow diagram of an illustrative method 400 for processing a request for document processing for financial transactions in accordance with one or more embodiments of the disclosure.

At block 405, the financial service module 246 of the financial service server 108 may receive a request for document analysis from a user device 104. In some embodiments, the request for document analysis may include an image of a document 106. In some embodiments, the document analysis request may be received over an encrypted network connection. In some embodiments, the document analysis request may be received in a plurality of segments. In some embodiments, the financial service module 246 may transmit the request for document analysis to the document analysis engine 266 of the document analysis server 110.

At block 410, the document analysis engine 266 of the document analysis server 110 may facilitate obtaining financial information from the image of the document 106. In some embodiments, the document analysis engine 266 may obtain the image of the document 106 from the request for document analysis. The document analysis engine 266 may generate a request for analysis which may include the image of the document 106. The request for analysis may be to process the image of the document 106 using optical character recognition (OCR). The request may be transmitted to the financial service server 108. The financial service server 108 may receive the request for analysis, process the image of the document 106 using OCR, and obtain information from the image of the document 106, such as a routing and account number for a check. In some embodiments, the financial service server 108 may generate a response using the information obtained from the image of the document and transmit the response to the document analysis engine 266. For example, the response may be sent to the document analysis engine 266 so that the obtained information may be used for further processing.

In some embodiments, the document analysis engine 266 of the document analysis server 110 may identify information from the image of the document 106 using optical character recognition (OCR). For example, the information may include financial information, such as a routing number and an account number, if the document 106 is a check. In some embodiments, the document analysis engine 266 of the document analysis server 110 may transmit the image of the document 106 to an OCR server to identify the information using OCR. The OCR server may then transmit the information back to the financial service module 246. In some embodiments, the OCR server may be operated in conjunction with the document analysis server 110. In some embodiments, the OCR server may be operated by a third-party outside of the system architecture.

In some embodiments, information may be received from a user device 104. In some embodiments, the user device 104 may obtain the information from a mobile device in communication with the user device 104. For example, a mobile device operated by a second user 102 may be in communication with the user device 104. For example, the user device 104 may be operated by a retail merchant and the second user 102 may be a customer of the retail merchant. Examples of a mobile device may include, but are not limited to, a smartphone, tablet, laptop, smart watch, wearable technology, or the like. The mobile device may be in communication with the user device 104 using Bluetooth, RF, Wi-Fi, or other type of communicative link. In some embodiments, an application executing on the mobile device may communicate information associated with the second userto the user device 104. In some embodiments, the information may be transmitted from the mobile device to the user device 104 in an encrypted message. In some embodiments, the application may be a digital wallet, merchant application, banking application, or the like. The second user 102 may provide the information to the application (e.g., typing the information into the application) or the information may be transmitted from the application upon the second user 102 signing into the application and initiating a transfer of the information to the user device 104. In some embodiments, obtaining the information from the application of the mobile device may be in conjunction with obtaining information from an image of a document. In some embodiments, a second user 102 may log into their financial account (e.g., banking account, credit card account, etc.) from the user device 104, which may then obtain the information from the account after the second user 102 provides log in credentials to the user device 104.

At block 415, the document analysis engine 266 of the document analysis server 110 may obtain data from the document analysis request. For example, the document analysis engine 266 of the document analysis server 110 may parse the request to identify user information, merchant information, transaction information, or the like. In some embodiments, the document analysis engine 266 of the document analysis server 110 may obtain and/or retrieve additional information from one or more datastores 112 using the information from the document 106 or the information from the document analysis request. For example, the document analysis engine 266 of the document analysis server 110 may obtain a transaction history associated with the user 102. The transaction history may include transactions initiated by the user 102. The document analysis engine 266 of the document analysis server 110 may analyze the transaction history to identify whether the user has previous negative transactions (e.g., returned checks for insufficient funds, etc.), whether the user 102 is in good standing with the merchant, and/or other factors.

At block 420, the document analysis engine 266 of the document analysis server 110 may process the information from the document and user identifying data. The document analysis engine 266 of the document analysis server 110 may generate a recommendation associated with the document. For example, the document analysis engine 266 of the document analysis server 110 may apply one or more rules for determining whether the document 106 is approved. In some embodiments, the determination may be based on the user information, financial information, and/or additional information. Additionally, the document analysis engine 266 of the document analysis server 110 may access one or more datastores 112 that may store data associated with historic data that may be related to the document. For example, the historic data may include any negative affiliations, such as, in the case of the document being a check, a check returned for insufficient funds, any outstanding or negative notes associated with the account of the document 106 or the like. The document analysis engine 266 of the document analysis server 110 may determine whether the document 106 has any historic data (e.g., positive or negative) associated with it. In some embodiments, if there is no historic data associated with the document 106, the document analysis engine 266 of the document analysis server 110 may analyze the information associated with the user 102 or associate parties (e.g., merchant of a transaction) to determine a probability that the document 106 is likely safe to use (e.g., funding of a check) or if there is a high risk associated with the document 106.

If at decision block 425, the document analysis engine 266 of the document analysis server 110 determines that the document 106 is not approved (e.g., approved to be funded), then the method may proceed to block 430, where the document analysis engine 266 of the document analysis server 110 may generate and transmit a message including the rejection to the user device 104. If at block 425, the document analysis engine 266 of the document analysis server 110 determines that the document 106 is approved (e.g., for check funding), then the method may proceed to block 435.

At block 435, the document analysis engine 266 of the document analysis server 110 initiate the settlement of a transaction based on the approval of the document 106 (e.g., transaction may be completed once the funds from the account associated with the check are transferred to the account of the merchant). The document analysis engine 266 may transmit a notification or message to the financial service module 246 to complete the transaction using the information from the document 106.

At block 440, the document analysis engine 266 of the document analysis server 110 may generate and transmit a message, including a message indicating that the document 106 has been approved, to the user device 104.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

The claimed subject matter is:

1. A system comprising:
a first financial analysis server; and
a second document analysis server; wherein:
the first financial analysis server identifies a transactions analysis request associated with a document for a transaction, wherein the transaction analysis request comprises data received from a graphical user interface displayed on a user device and an image of the document;
the first financial analysis server transmits the received transactions analysis request to the second document analysis server;
the second server identifies information from the image of the document;
the second document analysis server determines that the document should be used in the transaction based at least in part on the information obtained from the image of the document and the data received from the user device;
the second document analysis server generates a response to the transaction analysis request, wherein the response comprises a recommendation to use the document for the transaction; and
the second document analysis server transmits the response to the transaction analysis request to the user device.

2. The system of claim 1, wherein the recommendation comprises instructions to fund the payment instrument.

3. The system of claim 1, further comprising the second document analysis server transmitting a message to the first server to complete the transaction based at least in part on the information obtained from the image of the document and the data received from the user device.

4. The system of claim 1, wherein the transactions analysis request further comprises information received by the user device from a first device in communication with the user device.

5. The system of claim 1, wherein the image comprises an image of a payment instrument.

6. The system of claim 1, wherein the data received from the user device comprises one or more of a driver's license identifier and a username.

7. The system of claim 1, wherein the information from the image of the document comprises one or more of a type of transaction, an amount of transaction, and a date of transaction.

8. The system of claim 1, wherein the second document analysis server identifies information from the image of the document using optical character recognition (OCR).

9. The system of claim 1, wherein the second document analysis server determining that the document should be used in the transaction further comprises the second document analysis server identifying a transaction history associated with the user.

10. The system of claim 9, wherein the transaction history associated with the user further comprises at least one of a negative transaction between the user and a merchant and information indicative of user standing with the merchant.

11. A non-transitory computer-readable medium storing computer-executable instructions which, when executed by a processor, cause the processor to perform operations comprising:
identifying, by the processor, a received transactions analysis request associated with a document for a transaction, wherein the transaction analysis request comprises data received from a graphical user interface displayed on a user device and an image of the document captured using a camera on the user device;
identifying, by the processor, information from the image of the document;
determining, by the processor, that the document should be used in the transaction based at least in part on the information obtained from the image of the document and the data received from the user device;
generating, by the processor, a response to the transaction analysis request, wherein the response comprises a recommendation to use the document for the transaction; and
causing to send, by the processor, the response to the transaction analysis request to the user device.

12. The computer-readable medium of claim 11, wherein the transactions analysis request further comprises information received by the user device from a first device in communication with the user device.

13. The computer-readable medium of claim 11, wherein the instructions to determine further comprise instructions to cause to send the transaction analysis request to a first server for processing.

14. The computer-readable medium of claim 11, wherein the image comprises an image of a payment instrument.

15. The computer-readable medium of claim 11, wherein the recommendation comprises instructions to fund the payment instrument.

16. The computer-readable medium of claim 11, wherein the data received from the user device comprises one or more of a driver's license identifier and a username.

17. The computer-readable medium of claim 11, wherein the information from the image of the document comprises one or more of a type of transaction, an amount of transaction, and a date of transaction.

18. The computer-readable medium of claim 11, wherein the identifying information from the image of the document further comprises identifying information from the image of the document using optical character recognition (OCR).

19. The computer-readable medium of claim 11, wherein the determining further comprises identifying a transaction history associated with the user.

20. The computer-readable medium of claim 19, wherein the transaction history associated with the user further comprises at least one of a negative transaction between the user and a merchant and information indicative of user standing with the merchant.

* * * * *